United States Patent Office 3,072,471
Patented Jan. 8, 1963

---

3,072,471
HERBICIDAL AND ALGAECIDAL COMPOSITION
AND METHOD
Allen E. Smith, Oxford, Winchester L. Hubbard, Woodbridge, and John A. Riddell, Hamden, Conn., assignors to United States Rubber Company, New York, N.Y., a corporation of New Jersey
No Drawing. Filed Oct. 3, 1958, Ser. No. 765,052
10 Claims. (Cl. 71—2.3)

This invention relates to improvements in herbicides.

We have found that certain alkylamino-1,4-benzoquinones are effective herbicides and algaecides. These chemicals may be represented by the general formula

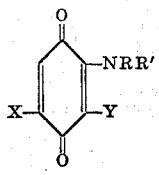

wherein X is a member selected from the group consisting of hydrogen and NRR', R is a member selected from the group consisting of hydrogen and alkyl, R' is alkyl, and Y is a member selected from the group consisting of hydrogen and methyl. The chemicals are known compounds. The 2-alkylamino-1,4-benzoquinones are prepared by the method of Plimpton, J. Chem. Soc. (London), 37, 642 (1880). The selected alkylamine in aqueous acetic acid is added to 1,4-benzoquinone in ethanol. The 2,5-bis(monoalkylamino)-1,4-benzoquinones are prepared by the method of Harger, J. Am. Chem. Soc., 46, 2540 (1924). The selected monoalkylamine is added to a solution of hydroquinone in ethanol, followed by bubbling oxygen through the solution. The 2,5-bis(dialkylamino)-1,4-benzoquinones are prepared by adding cupric acetate monohydrate to a solution of the selected dialkylamine in methanol forming a soluble copper-amine complex. To this solution is added 1,4-benzoquinone, followed by bubbling oxygen through the solution.

The chemicals of the present invention may be applied to the growing weeds in soil. In the case of aquatic weeds, the chemicals may be applied to the weeds and the water containing the weeds. In the case of algae, the chemicals may be applied to the algae by adding the chemicals to the water containing the algae. The chemicals may be applied as dusts when admixed with a powdered solid carrier, such as various mineral silicates, e.g. mica, talc, pyrophillite and clays. The chemicals may be mixed with surface-active dispersing agents, as herbicidal concentrates, to facilitate dispersing in water and to improve the wetting properties when used as sprays. If desired, the chemicals may be mixed with a powdered solid carrier together with a surface-active dispersing agent so that a wettable powder may be obtained which may be applied directly, or which may be shaken up with water to make an aqueous dispersion for application in that form. The chemicals may be dissolved in an oil such as a hydrocarbon or chlorinated hydrocarbon oil, and the oil solution of the chemical dispersed in water with the aid of a surface-active dispersing agent to give a sprayable aqueous dispersion. Such surface-active dispersing agents may be anionic or non-ionic or cationic surface-active agents. Such surface-active agents are well known and reference is made to Hoffman et al. U.S. Patent No. 2,614,916, columns 2 to 4, for detailed examples of the same. The chemicals of the present invention may be applied by the aerosol method. Solutions for the aerosol treatment may be prepared by dissolving the chemical directly in the aerosol carrier which is a liquid under pressure but which is a gas at ordinary temperature (e.g. 20° C.) and atmospheric pressure, or the aerosol solution may be prepared by first dissolving the chemical in a less volatile solvent and then admixing such solution with the highly volatile liquid aerosol carrier.

The following illustrates the invention.

Example 1

This example illustrates the control of weeds in soil.

One-fourth teaspoon of a mixture of weed seeds was spread evenly over the surface of a rich sandy-loam soil in each of a number of 4" x 4" x 4" boxes. The weed seed mixture was made up of five broadleaved species, namely pigweed (Amaranthus spp.), purslane (Portulaca spp.), quickweed (galinsoga spp.), ragweed (Ambrosia spp.) and lambsquarters (Chenopodium spp.) and three grass types, namely, crabgrass (Digitaria spp.), barnyard grass (Echinochloa spp.) and foxtail (Setaria spp.). The germinating seeds were maintained under a 16 hour light and an 8 hour dark exposure per 24 hour period and at a temperature of 75° F. for 10 days. At this time the broadleaved weed species were approximately 1½" tall and the grassy weed species had leaves 4" to 5" tall. Duplicate boxes of weeds were sprayed to run-off with aqueous dispersions of the chemicals at a number of concentrations. The aqueous dispersions of the chemicals contained a small amount, about 0.01%, of a surface-active dispersing agent which was a reaction product of ethylene oxide and an alkylphenol. The effectiveness of the compounds was determined after 10 days by estimating the percent control of the weeds compared to the untreated check boxes. Data was recorded as the concentration of chemical in parts per million (p.p.m.) required to kill 90% of the weeds (LD-90). These concentrations were converted to pounds of chemical per acre rate (lbs/a.) required to kill 90% of the weeds, spraying to run off being equivalent to spraying a volume of 250 gallons per acre under normal field conditions. The pounds of chemicals per acre to kill 90% of the weeds are shown in the following table:

| Chemical: | LD-90 (lbs./a.) |
|---|---|
| 2-dimethylamino-1,4-benzoquinone | 2 |
| 2,5-bis(dimethylamino)-1,4-benzoquinone | 2 |
| 2,5-bis(monoethylamino)-1,4-benzoquinone | 4 |
| 2,5-bis(diethylamino)-1,4-benzoquinone | 2 |
| 2,5-bis(di-n-propylamino)-1,4-benzoquinone | 10 |
| 2,5-bis(dimethylamino)-3-methyl-1,4-benzoquinone | 4 |

Example 2

This example illustrates the control of aquatic weeds.

A number of dishes with dimensions 4" x 4" x 2" were half filled with water (½ pint) and a soluble fertilizer (10% nitrogen, 52% phosphorous and 17% potassium content) was added to a final concentration of 200 p.p.m. in the water. The pH of the solution was seven.

A sufficient number of duckweed (*Spirodela polyrhiza* (L.) Schleid) plants or fronds were transferred from a stock culture to cover one-half of the surface area of the dishes.

Aqueous dispersions of various chemicals were sprayed on the duckweed and water in separate dishes at a rate of 30 allons per acre and with concentrations of the chemicals to give 1 lb. per acre rate of application of the chemicals. Duplicate dishes were sprayed with each aqueous dispersion. Activity of the chemicals was determined five days later by determining the percent kill of the duckweed fronds compared to the untreated control. Results are shown in the following table:

| Chemical: | Percent kill |
|---|---|
| 2-dimethylamino-1,4-benzoquinone | 100 |
| 2,5-bis(dimethylamino)-1,4-benzoquinone | 100 |

Example 3

This example illustrates the control of algae.

Suspensions of various chemicals of the invention were prepared by mixing 0.1 gm. of the chemical in 5 ml. of ethyl alcohol and one drop of surface-active dispersing agent which was a reaction product of ethylene oxide and an alkylphenol, and diluting with distilled water to a final volume of 50 ml. One ml. each of these 2,000 parts per million (p.p.m.) stock solutions was added to 199 ml. of the algae culture solution contained in a 250 ml. flask. Approximately the same number of algae were present in each flask. The final concentration of chemical was 10 p.p.m. Duplicate flasks were run for each chemical. The effectiveness of the various chemicals was determined between the tenth and fourteenth day after treatment by estimating the percent kill by visual observation compared to the untreated check flasks. The algae culture used contained a number of species with the principal one being the green type, genus Scenedesmus. The percent kill of the algae by 10 p.p.m. suspensions of the chemicals are shown in the following table:

| Chemical: | Percent kill |
| --- | --- |
| 2-dimethylamino-1,4-benzoquinone | 77 |
| 2,5-bis(dimethylamino)-1,4-benzoquinone | 98 |
| 2,5-bis(monoethylamino)-1,4-benzoquinone | 97 |
| 2,5-bis(diethylamino)-1,4-benzoquinone | 57 |
| 2,5-bis(monoisopropylamino)-1,4-benzoquinone | 80 |
| 2,5-bis(di-n-propylamino)-1,4-benzoquinone | 60 |
| 2,5-bis(dimethylamino)-3-methyl-1,4-benzoquinone | 94 |

Having thus described our invention, what we claim and desire to protect by Letters Patent is:

1. A herbicidal and algaecidal concentrate comprising a phytotoxic amount of a chemical having the general formula

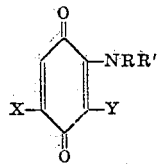

wherein X is a member selected from the group consisting of hydrogen and NRR', R is a member selected from the group consisting of hydrogen and alkyl radicals having 1 to 3 carbon atoms, R' is an alkyl radical having 1 to 3 carbon atoms, and Y is a member selected from the group consisting of hydrogen and methyl, and as an adjuvant therefor a surface-active dispersing agent.

2. A herbicidal composition comprising an amount effective to kill weeds of a chemical having the general formula

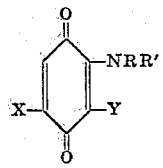

wherein X is a member selected from the group consisting of hydrogen and NRR', R is a member selected from the group consisting of hydrogen and alkyl radicals having 1 to 3 carbon atoms, R' is an alkyl radical having 1 to 3 carbon atoms, and Y is a member selected from the group consisting of hydrogen and methyl, said composition containing a surface-active dispersing agent.

3. An algaecidal composition comprising an amount effective to kill algae of a chemical having the general formula

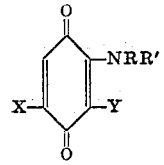

wherein X is a member selected from the group consisting of hydrogen and NRR', R is a member selected from the group consisting of hydrogen and alkyl radicals having 1 to 3 carbon atoms, R' is an alkyl radical having 1 to 3 carbon atoms, and Y is a member selected from the group consisting of hydrogen and methyl, said composition containing a surface-active dispersing agent.

4. A herbicidal and algaecidal concentrate comprising a phytotoxic amount of 2,5-bis(dimethylamino)-1,4-benzoquinone and as an adjuvant therefor a surface-active dispersing agent.

5. A herbicidal and algaecidal concentrate comprising a phytotoxic amount of 2,5-bis(diethylamino)-1,4-benzoquinone and as an adjuvant therefor a surface-active dispersing agent.

6. The method of destroying growing weeds in soil which comprises applying to said weeds a chemical having the general formula

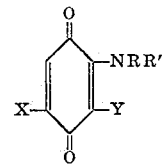

wherein X is a member selected from the group consisting of hydrogen and NRR', R is a member selected from the group consisting of hydrogen and alkyl radicals having 1 to 3 carbon atoms, R' is an alkyl radical having 1 to 3 carbon atoms, and Y is a member selected from the group consisting of hydrogen and methyl, said chemical being applied at a rate effective to kill said weeds.

7. The method of destroying growing weeds in soil which comprises applying 2,5-bis(dimethylamino)-1,4-benzoquinone to said weeds at a rate effective to kill said weeds.

8. The method of destroying growing weeds in soil which comprises applying 2,5-bis(dimethylamino)-1,4-benzoquinone to said weeds at a rate effective to kill said weeds.

9. The method of destroying aquatic weeds in water which comprises contacting the weeds with a chemical having the general formula

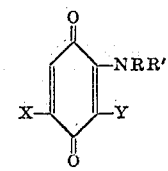

wherein X is a member selected from the group consisting of hydrogen and NRR', R is a member selected from the group consisting of hydrogen and alkyl radicals having 1 to 3 carbon atoms, R' is an alkyl radical having 1 to 3 carbon atoms, and Y is a member selected from the group consisting of hydrogen and methyl, said chemical being applied at a rate effective to kill said weeds.

10. The method of killing algae in water which comprises applying to said algae a chemical having the general formula

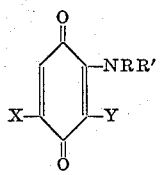

wherein X is a member selected from the group consisting of hydrogen and NRR', R is a member selected from the group consisting of hydrogen and alkyl radicals having 1 to 3 carbon atoms, R' is an alkyl radical having 1 to 3 carbon atoms, and Y is a member selected from the group consisting of hydrogen and methyl, said chemical being applied at a rate effective to kill said algae.

References Cited in the file of this patent
UNITED STATES PATENTS 2,077,887    Kranzlein et al. _____ Apr. 20, 1937

OTHER REFERENCES

Plimpton: J. Chem. Soc. (London), 37, 642 (1880).
Harger: J. Am. Chem. Soc., 46, 2540–2550 (1924).
Thompson et al.: "Botanical Gazette," vol. 107, pages 475 to 507 (1946).
Martynoff et al.: "Chemical Abstracts," vol. 41, page 5478 (1947).
Schmid et al.: "Helv. Chim. Acta.," vol. 27, 1197 to 1199 (1944).